Oct. 18, 1955 — T. H. MILLER — 2,720,899
METHOD OF PRODUCING TRIANGULARLY SHAPED TIMBERS
Filed May 27, 1954
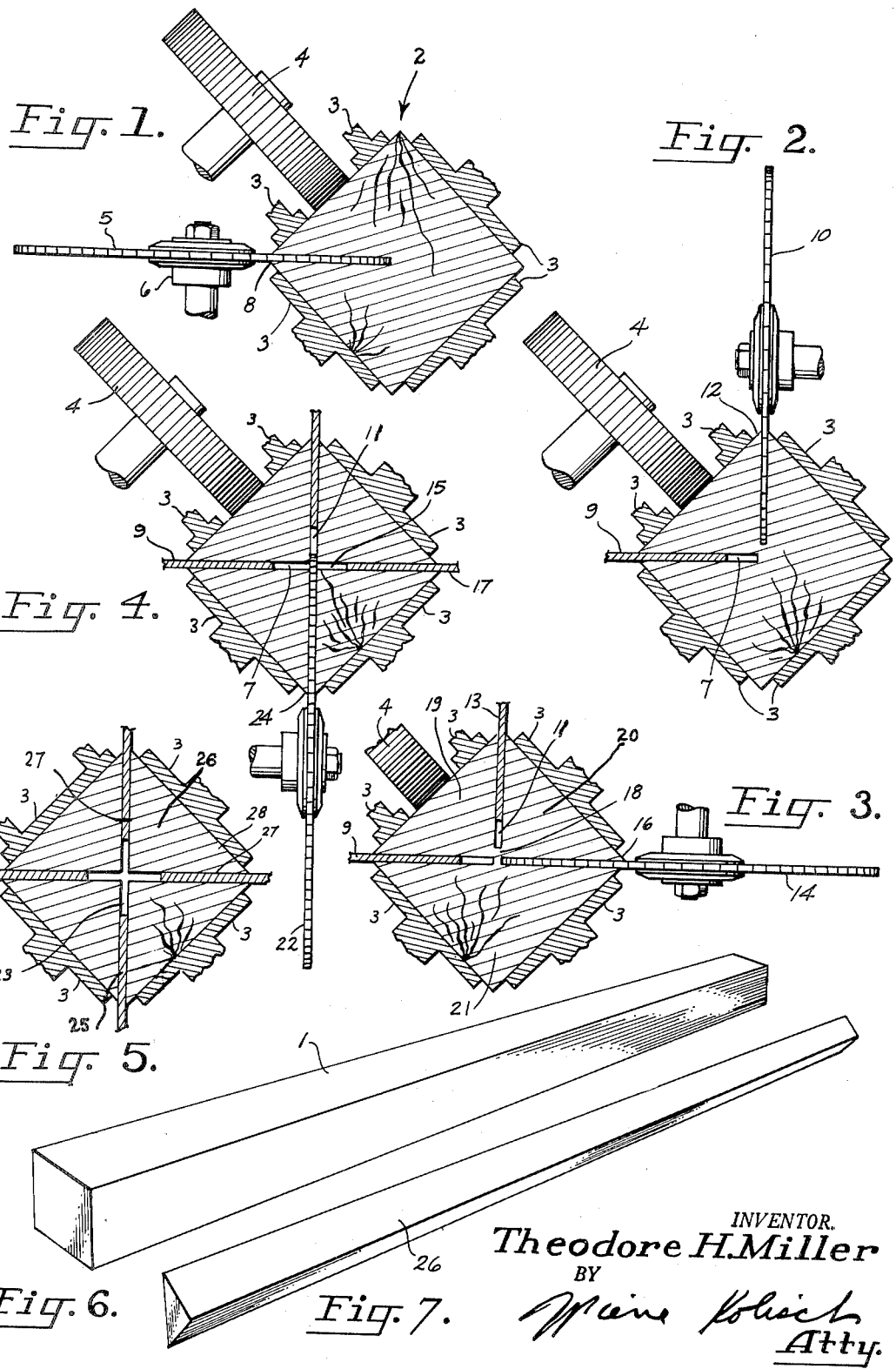
INVENTOR.
Theodore H. Miller

United States Patent Office 2,720,899
Patented Oct. 18, 1955

2,720,899

METHOD OF PRODUCING TRIANGULARLY SHAPED TIMBERS

Theodore H. Miller, Portland, Oreg.

Application May 27, 1954, Serial No. 432,697

4 Claims. (Cl. 144—309)

This invention relates to a method of producing elongated triangularly shaped pieces of wood and more specifically to a method of dividing an elongated piece of wood into four elongated pieces having right angle isosceles triangular cross-sections.

The product of the invention has many uses in construction work such as in reinforced panel units and in picket and rail fences. Additionally, the triangularly shaped timbers have eye appeal which permits employing them for decorative as well as structural purposes. The timbers have uniformly flat clean sides which enable them to be used in an "as is" condition without further finishing. The elongated timbers remain straight and have greater strength than a rectangularly or otherwise shaped piece of wood of the same value.

The object of the invention is to produce a piece of wood having the foregoing characteristics. Generally, the object is accomplished by taking an elongated square stick of timber and moving it lengthwise while maintaining it rigid to prevent any movement thereof except lengthwise, and successively cutting kerfs from the corners of the timber to its center. The first three kerfs are cut to points which are just short of center and the fourth kerf is cut slightly deeper and through the center thereby permitting the square timber to be longitudinally divided into four individual triangularly shaped pieces. The four pieces are identical and do not have rough or broken edges. The uniformity and good quality of the pieces is the result of cutting kerfs up to the center of the original square stick rather than cutting all the way through it as is commonly done in resawing and ripping operations, and maintaining the square stick rigid and corresponding to the original dimensions while the kerfs are being cut.

In my copending U. S. Patent No. 2,684,088 there is disclosed one type of machinery for producing elongated timbers according to the invention. It will be appreciated by those familiar with the art that other machinery could be employed to practice the method of the present invention. It is intended to include in the present invention all methods similar to the present as defined in the appended claims.

The invention will be described in greater detail with reference to the drawings in which:

Fig. 1 is an end view showing the first cutting step according to the invention.

Fig. 2 is an end view showing the second cutting step according to the invention.

Fig. 3 is an end view showing the third cutting step according to the invention.

Fig. 4 is an end view showing the fourth cutting step according to the invention.

Fig. 5 is an end view showing a timber which has been cut from four corners according to the invention.

Fig. 6 is a perspective view of the original square timber which is divided into triangularly shaped pieces according to the invention, and Fig. 7 is a perspective view of a triangularly shaped stick of timber produced according to the invention.

An elongated piece of timber 1 which preferably has a square cross-section and may conveniently be a standard 4" x 4", is placed in a guideway or feedway generally indicated at 2 which comprises a plurality of members 3 which encircle the timber while closely encompassing it. A means for longitudinally moving the timber through the guideway are provided in the form of a driven feed roller 4 mounted above the timber. The periphery of the roller engages the upper surface of the timber and moves it lengthwise through the guideway whose members 3 are in sliding engagement with the sides of the timber.

A circular saw 5 mounted on a hub 6 is positioned along the length of the guideway in an opening provided between adjacent members 3. As timber 1 is moved along it is engaged by saw 5, and a kerf 7 is cut in the timber from one of its external corners 8 to a point just short of the center of the timber. Extending longitudinally from a point just behind saw 5 to the end of the guideway means are provided for temporarily replacing most of the material removed by the saw in cutting kerf 7 in the form of a kerf filler 9 which extends into kerf 7 to a depth greater than half that of the kerf. Kerf filler 9 may conveniently be a metal bar having the same thickness as kerf 7.

After kerf 7 is cut another circular saw 10 similarly mounted to saw 5 but angularly displaced 90 degrees from saw 5 cuts a kerf 11 from another corner 12 of the timber to a point just short of the center of the timber. Another kerf filler 13 extends into kerf 11 similarly to the way kerf filler 9 extends into kerf 7.

As the timber continues its movement through the guideway, it is engaged by a third circular saw 14 angularly displaced at 90 degrees with respect to saw 10, which cuts a kerf 15 from corner 16 of the timber to a point just short of the center. Another kerf filler 17 similar to kerf fillers 9 and 13 extends into kerf 15.

Referring to Fig. 3, it will be seen that after the cutting of the three circular saws previously described, a center area 18 of the timber remains intact and three portions 19, 20 and 21 of the timber are held together by the wood fibers at center 18. The kerf fillers and guideway members combine to prevent any possible relative movement of portions 19, 20 and 21 as they are moved along the guideway.

A further circular saw 22 is mounted similarly to the other saws and is angularly displaced 90 degrees with respect to saw 14. Saw 22 cuts a kerf 23 from corner 24 of the timber through center 18 and up to kerf 12. Another kerf filler 25 similar to the previously mentioned kerf fillers extends into kerf 23. Once saw 22 has cut through to kerf 11, the timber 1 is divided into four separate pieces. It will be noted that each of these pieces, such as 26, has an isosceles triangular cross-section defined by equal legs 27 and the hypotenuse side 28.

The depth to which the four saws cut into timber 1 may be adjusted by providing means for accurately lowering or raising the supporting hubs of the saws, or if the position of the hubs remain fixed, the depth of kerf can be varied depending on the diameter of the saw employed.

Referring to Figs. 3 and 4, it will be seen that kerfs 7 and 15 are cut to points just short of the center which are apart from one another the thickness of kerf 23. Kerf 11 is cut to a point which is just short of center or a kerf thickness distance from the closest edges of kerfs 7 and 15 so that when kerf 23 is cut, all four kerfs will be joined to one another at the center of the timber.

Kerf fillers 9, 13, 17 and 25 remain in the kerfs only as long as the timbers are still in the guideway. The timber and pieces are pushed through the machine by a succeeding timber which is fed into the machine in end to end alignment and urged forwardly by roller 4. The finished pieces, such as 26, Fig. 7, are discharged from the end of the guideway.

I claim:

1. The method of longitudinally dividing a stick of timber into at least three triangularly shaped pieces of timber comprising the steps of moving the timber lengthwise while maintaining it rigid, successively cutting kerfs from the surface of the timber towards the center substantially a kerf thickness apart, and cutting a last kerf from the surface of the timber through the center of the timber to divide it into separate pieces.

2. The method of longitudinally dividing an elongated piece of timber having a rectangular cross section into elongated pieces of timber having triangular cross sections comprising the steps of moving the timber lengthwise while encompassing and constricting it, successively cutting kerfs from the surface of the timber towards the center to points substantially a kerf thickness apart, cutting a final kerf from the surface of the timber through the center of the timber to divide it into separate pieces.

3. The method of longitudinally dividing an elongated piece of timber having a square cross section into four elongated pieces of timber having isosceles triangular cross sections comprising the steps of moving the timber lengthwise while encompassing and constricting it to prevent all movement except lengthwise movement of the timber, successively cutting kerfs from the surface of the timber to a point just short of the center of the piece of timber, the kerfs cut from opposite sides of the timber being substantially a kerf thickness apart, cutting a final kerf from the surface of the timber through the center, and each time that a kerf is cut temporarily replacing the material removed from the kerf while the timber is being longitudinally moved.

4. The method of longitudinally dividing an elongated piece of timber having a square cross section into four elongated pieces of timber having isosceles triangular cross sections comprising the steps of moving the timber lengthwise while encompassing and constricting it to prevent all movement except lengthwise movement of the timber, cutting a first kerf from a first corner of the timber to a point just short of the center of the piece of timber, cutting a second kerf from a second corner of the timber to a point just short of the center, cutting a third kerf from a third corner of the timber opposite the first corner to a point a kerf thickness from the first kerf, cutting a fourth kerf from a fourth corner through the center of the timber to divide it into four separate pieces, and each time that a kerf is cut temporarily replacing the material removed from the kerf while the timber is being longitudinally moved.

References Cited in the file of this patent

UNITED STATES PATENTS

| 686,539 | Ross | Nov. 12, 1901 |
| 2,303,480 | Lipic | Dec. 1, 1942 |
| 2,634,774 | Francar | Apr. 14, 1953 |